Oct. 23, 1962     W. A. HELSTEN     3,059,729
SINGLE SHOE TREAD BRAKE ARRANGEMENT
Filed Sept. 28, 1959
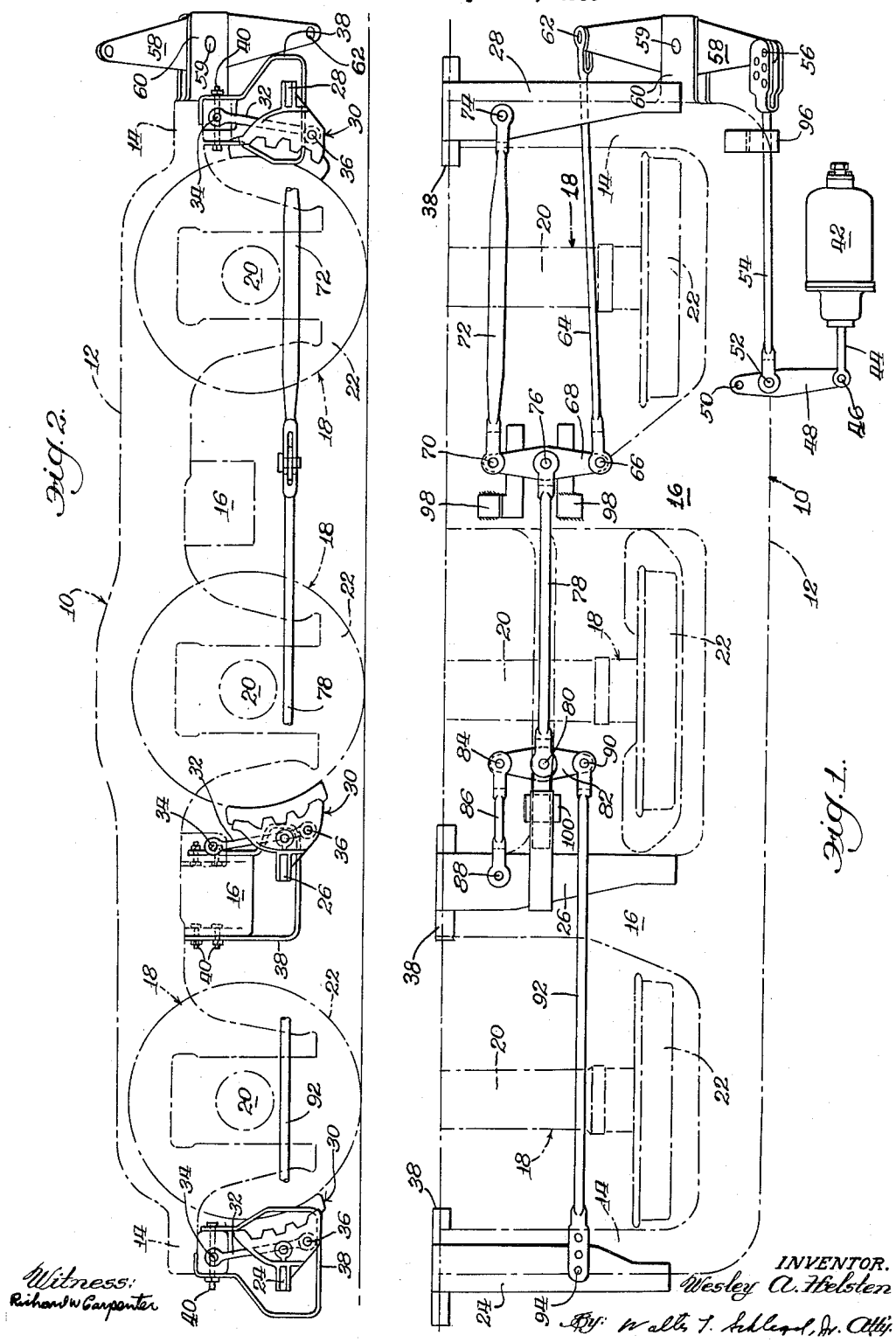
INVENTOR.
Wesley A. Helsten

United States Patent Office 3,059,729
Patented Oct. 23, 1962

3,059,729
SINGLE SHOE TREAD BRAKE ARRANGEMENT
Wesley A. Helsten, Chicago, Ill., assignor to Amsted Industries Incorporated, Chicago, Ill., a corporation of New Jersey
Filed Sept. 28, 1959, Ser. No. 842,697
3 Claims. (Cl. 188—46)

This invention relates to brakes and more particularly to a tread brake arrangement for a six-wheel railway vehicle truck.

The invention comprehends an improved linkage system for interconnecting the power means and the brake means associated with the respective wheel and axle assemblies.

In many conventional linkage arrangements, the majority of pull rods and equalizer levers are located in the upper regions of the truck, sometimes above the frame. In some cases, however, because of the construction of the vehicle body supported by the truck, or because of the space occupied by other equipment carried by or mounted on the truck, there is little room available for applying a brake linkage system to the truck.

Accordingly, it is an object of this invention to provide an improved single shoe tread brake arrangement for a six-wheel railway vehicle truck.

A more specific object of the invention is the provision of a tread brake linkage arrangement for a six-wheel truck wherein practically all of the linkage elements are disposed in a horizontal plane located below the axes of rotation of the wheel and axle assemblies.

These and other objects of the invention will be apparent from an examination of the following description and drawing, wherein:

FIGURE 1 is a fragmentary top plan view of a railway vehicle truck to which has been applied a tread brake arrangement embodying features of the invention, only one side of the truck being shown as it may be symmetrical about its longitudinal vertical center plane, and FIGURE 2 is a side elevational view of the structure illustrated in FIGURE 1.

It will be understood that certain elements have been intentionally omitted from certain views where they are better illustrated elsewhere.

Referring now to the drawing for a better understanding of the invention, it will be seen that a single shoe tread brake arrangement embodying features of the invention is shown as applied to a railway car truck having a preferably unitary frame indicated generally at 10, which comprises spaced side members 12 interconnected at their ends by end rails 14 and interconnected intermediate their ends by transoms 16.

The frame is supported by three wheel and axle assemblies, indicated generally at 18, each of which comprises an axle 20 and a pair of wheels 22, only one of which is shown.

Deceleration of the wheel and axle assemblies is achieved by brake means, which includes three brake beams 24, 26, and 28 which are disposed adjacent the left, center, and right wheel axle assemblies, respectively, as best seen in FIGURE 2 of the drawing.

Each brake beam has pivotally connected to its ends in the usual manner a pair of brake shoe assemblies (only one of which is shown). Additional support for the shoe assemblies may be provided by hangers 32, which are pivotally connected at their upper ends to the frame by pins 34 and at their lower ends to the shoe assemblies by pins 36. Also, in order to afford additional safety, each of the brake beams may be supported by a safety bracket 38 secured to the truck frame by nut and bolt assemblies 40.

Actuation of the brake means on each side of the truck may be provided by means of a power cylinder 42 mounted on the outboard side of the members 12 on the truck frame, in any desired manner, outboardly adjacent and in longitudinal alignment with one of the end wheel and axle assemblies, in this case preferably the right hand assembly, as seen in FIGURE 2.

The power cylinder includes a rod 44 extending outwardly therefrom toward the center of the truck and being pivotally connected by pin 46 to the outboard end of a generally horizontally disposed transversely extending dead cylinder lever 48, which is fulcrumed at its inboard end to the side member 12 of the frame by pin 50.

As best seen in FIGURE 1, the cylinder lever is pivotally connected intermediate its ends by pin 52 to one end of a tension rod 54, the other end of which is pivotally connected by pin 56 to the upper end of a dead actuating lever 58, which is fulcrumed intermediate its ends by pin 59 to a pair of lugs 60, preferably formed integrally with the adjacent end rail 14 of the frame.

The lower end of the actuating lever 58 is pivotally connected by pin 62 to one end of a pull rod 64, the other end of which is pivotally connected by pin 66 to the outboard end of a generally horizontal floating transversely extending equalizer lever 68, the inboard end of which is pivotally connected by pin 70 to one end of a pull rod 72 and the other end of which is pivotally connected by pin 74 to the brake beam 28 disposed on the outer side of the right end wheel and axle assembly 18.

The equalizer lever 68, as best seen in FIGURE 1, is pivotally connected intermediate its ends by pin 76 to one end of a pull rod 78, the other end of which may be pivotally connected by pin 80 to a second floating transversely extending horizontal equalizer lever 82. As best seen in FIGURE 1, the equalizer levers are disposed on opposite sides of the center wheel and axle assembly 18.

The second equalizer lever 82 is pivotally connected at its inboard end by pin 84 to a pull rod 86, the other end of which is connected by a pin 88 to the brake beam 26 disposed adjacent the center wheel and axle assembly 18.

At its outboard end, the equalizer lever 82 is pivotally connected by pin 90 to one end of a pull rod 92, the other end of which is pivotally connected by pin 94 to the brake beam 24 disposed outwardly adjacent the left end wheel and axle assembly 18.

In order to provide additional support for the linkage, there may be provided a bracket 96 secured to the side member 12 of the frame for supporting pull rod 54. Also, the first or right hand equalizer lever 68 may be provided with a pair of support brackets 98 while the left hand or second equalizer lever 82 may be indirectly supported by means of a guide bracket 100 within which is slidably disposed the left hand end of pull rod 78.

It will be understood that all of the pull rods and equalizer levers which serve to interconnect the brake beams with the lower end of the actuating lever 58 are all disposed for movement within a common horizontal plane which is disposed below the axes of rotation of the wheel and axle assemblies of the truck so as to leave the upper portion of the truck free of all obstructing rigging.

In operation, it will be seen that as power cylinder 42 is energized, cylinder lever 48 is urged to rotate in a clockwise direction about its fulcrum 50 thereby moving tension rod 54 to the left end causing vertical actuating lever 58 to rotate in a clockwise direction, as seen in FIGURE 1, about pin 59. As this happens, pull rod 64 is moved to the right causing equalizer lever 68 to rotate in a counter-clockwise direction about pin 76 to bring the brake shoe assembly of brake beam 28 into engagement with its related wheel and axle assembly. As this happens, the fulcrum of lever 68 shifts from pin 76 to pin 70 and the lever continues to rotate in a counter-clockwise direction, carrying pull rod 78 to the right and causing equalizer lever 82 to rotate in a clockwise direction about pin 90 until the brake shoe assembly of brake beam 26 is pulled into engagement with its related wheel and axle assembly. At this point, the fulcrum of lever 82 shifts from pin 90 to pin 84 and the direction of the movement of the lever is reversed as lever 82 is now urged to rotate in a counter-clockwise direction about pin 84 and thereby pull the brake shoe assembly of brake beam 24 into engagement with its related wheel and axle assembly.

I claim:

1. In a tread brake arrangement for a six-wheel railway vehicle truck having a frame supported by a center and a pair of end wheel and axle assemblies, the combination of: brake means disposed on the outer sides of the end assemblies for engagement with the wheels thereof; other brake means disposed adjacent the center assembly for engagement with the wheel thereof; each of said brake means including a brake beam suspended from the frame and carrying friction means engageable with the wheel of a related assembly; a power cylinder member mounted on the frame outboardly adjacent one of the end assemblies; a transversely extending dead horizontal cylinder lever having its inboard and outboard ends pivoted to the truck frame and the power cylinder member, respectively; a dead generally vertical actuating lever fulcrumed intermediate its ends to an end of the frame adjacent said one end assembly; a tension rod interconnecting a medial portion of the cylinder lever and the upper end of the actuating lever; a pair of transversely extending live horizontal equalizer levers; a pull rod interconnecting medial portions of said equalizer levers; a pair of pull rods connecting the inboard ends of the equalizer levers to the brake beams associated with the center assembly and said one end assembly, respectively; a pull rod connecting the outboard end of one of said equalizer levers to the brake beam associated with the other end assembly; and another pull rod connecting the outboard end of the other equalizer lever to the lower end of said actuating lever; said pull rods, said equalizer levers, and said brake beams all being disposed in a common horizontal plane located below the axes of rotation of said wheel and axle assemblies, and said pull rods and equalizer levers being located inboardly of the wheels of said assemblies.

2. In a tread brake arrangement for a six-wheel railway vehicle truck having a frame supported by a center and a pair of end wheel and axle assemblies, the combination of: brake means disposed at the outer sides of the end assemblies for engagement with the wheels thereof; other brake means disposed adjacent the center assembly for engagement with the wheel thereof; each of said brake means including a brake beam suspended from the frame and carrying friction means engageable with the wheel of a related assembly; a power cylinder member mounted on the frame outboardly adjacent one of the end assemblies and in line therewith; a dead horizontal cylinder lever having its inboard and outboard ends pivoted to the truck frame and the power cylinder, respectively; a dead inclined actuating lever having a substantial vertical component fulcrumed intermediate its ends to an end of the frame adjacent said one end assembly; a tension rod interconnecting a medial portion of the cylinder lever and the upper end of the actuating lever; a pair of live horizontal equalizer levers; a pull rod interconnecting medial portions of said equalizer levers; a pair of pull rods connecting the inboard ends of the equalizer levers to the brake beams associated with the center assembly and said one end assembly, respectively; a pull rod connecting the outboard end of one of said equalizer levers to the brake beam associated with the other end assembly; and another pull rod connecting the outboard end of the other equalizer lever to the lower end of said actuating lever; said pull rods, said equalizer levers, and said brake beams all being disposed in a common horizontal plane located below the axes of rotation of said wheel and axle assemblies, and said pull rods and equalizer levers being located inboardly of the wheels of said assemblies.

3. In a tread brake arrangement for a six-wheel railway vehicle truck having a frame supported by a center and a pair of end wheel and axle assemblies, the combination of: brake means disposed at the outer sides of the end assemblies for engagement with the wheels thereof; other brake means disposed adjacent the center assembly for engagement with the wheel thereof; each of said brake means including a brake beam supported by the frame and carrying friction means engageable with the wheel of a related assembly; a power cylinder member mounted on the frame; a dead horizontal cylinder lever having its inboard and outboard ends pivoted to the truck frame and the power cylinder member, respectively; a dead generally vertical actuating lever fulcrumed intermediate its ends to the frame; a tension rod interconnecting a medial portion of the cylinder lever and the upper end of the actuating lever; a pair of live horizontal equalizer levers; a pull rod interconnecting medial portions of said equalizer levers; a pair of pull rods connecting the inboard ends of the equalizer levers to the brake beams associated with the center assembly and one end assembly, respectively; a pull rod connecting the outboard end of one of said equalizer levers to the brake beam associated with the other end assembly; and another pull rod connecting the outboard end of the other equalizer lever to the lower end of said actuating lever; said pull rods, said equalizer levers, and said brake beams all being disposed in a common horizontal plane located below the axes of rotation of said wheel and axle assemblies, and said pull rods and equalizer levers being located inboardly of the wheels of said assemblies.

References Cited in the file of this patent

UNITED STATES PATENTS

| | | |
|---|---|---|
| 1,987,658 | Aurien | Jan. 15, 1935 |
| 2,132,994 | Mueller | Oct. 11, 1938 |
| 2,149,496 | Baselt | Mar. 7, 1939 |
| 2,402,389 | Gantner | June 18, 1946 |
| 2,627,944 | Simanek | Feb. 10, 1953 |
| 2,844,222 | Polanin | July 22, 1958 |